US009163143B2

(12) United States Patent
Tarao

(10) Patent No.: US 9,163,143 B2
(45) Date of Patent: *Oct. 20, 2015

(54) GOLF BALL

(71) Applicant: DUNLOP SPORTS CO. LTD., Kobe-shi, Hyogo (JP)

(72) Inventor: Toshiyuki Tarao, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 165 days.

This patent is subject to a terminal disclaimer.

(21) Appl. No.: 13/622,041

(22) Filed: Sep. 18, 2012

(65) Prior Publication Data

US 2013/0017908 A1    Jan. 17, 2013

Related U.S. Application Data

(62) Division of application No. 12/003,598, filed on Dec. 28, 2007, now Pat. No. 8,349,952.

(30) Foreign Application Priority Data

Dec. 28, 2006  (JP) ................................ 2006-356547
Dec. 28, 2006  (JP) ................................ 2006-356548
Jul. 20, 2007   (JP) ................................ 2007-190111
Jul. 20, 2007   (JP) ................................ 2007-190112

(51) Int. Cl.
  *A63B 37/00*   (2006.01)
  *A63B 37/12*   (2006.01)
  *C08L 75/04*   (2006.01)
  *C08G 18/10*   (2006.01)
  *C08G 18/48*   (2006.01)
  *C08G 18/75*   (2006.01)
  *C08G 18/76*   (2006.01)
  *C08G 18/79*   (2006.01)

(52) U.S. Cl.
  CPC ............. *C08L 75/04* (2013.01); *A63B 37/0023* (2013.01); *A63B 37/0055* (2013.01); *A63B 37/0065* (2013.01); *C08G 18/10* (2013.01); *C08G 18/4854* (2013.01); *C08G 18/758* (2013.01); *C08G 18/7664* (2013.01); *C08G 18/792* (2013.01); *A63B 37/0031* (2013.01); *A63B 37/0053* (2013.01); *A63B 37/0063* (2013.01); *A63B 37/0064* (2013.01); *A63B 37/0074* (2013.01); *A63B 37/0075* (2013.01); *A63B 37/0076* (2013.01)

(58) Field of Classification Search
  None
  See application file for complete search history.

(56) References Cited

U.S. PATENT DOCUMENTS

| | | |
|---|---|---|
| 3,395,109 A | 7/1968 | Molitor et al. |
| 3,989,568 A | 11/1976 | Isaac |
| 4,123,061 A | 10/1978 | Dusbiber |
| 4,248,432 A | 2/1981 | Hewitt et al. |
| 4,347,338 A | 8/1982 | Torii et al. |
| 5,334,673 A | 8/1994 | Wu |
| 5,553,852 A | 9/1996 | Higuchi et al. |
| 5,874,038 A | 2/1999 | Kasashima et al. |
| 5,947,844 A | 9/1999 | Shimosaka et al. |
| 6,123,534 A | 9/2000 | Kasashima et al. |
| 6,123,628 A | 9/2000 | Ichikawa et al. |
| 6,258,310 B1 | 7/2001 | Sardanopoli et al. |
| 6,346,053 B1 | 2/2002 | Inoue et al. |
| 6,620,059 B2 | 9/2003 | Sasaki et al. |
| 6,660,824 B2 | 12/2003 | Yokota |
| 6,685,456 B2 | 2/2004 | Sajima |
| 6,686,436 B2 | 2/2004 | Iwami |
| 6,747,100 B2 | 6/2004 | Ichikawa et al. |
| 6,764,415 B2 | 7/2004 | Ichikawa et al. |
| 6,806,323 B2 | 10/2004 | Ichikawa et al. |
| 6,887,168 B2 | 5/2005 | Hayashi et al. |
| 6,966,850 B2 | 11/2005 | Watanabe et al. |
| 6,992,145 B2 | 1/2006 | Ichikawa et al. |
| 7,052,415 B2 | 5/2006 | Sasaki et al. |
| 7,090,799 B2 | 8/2006 | Takesue et al. |
| 7,140,979 B2 | 11/2006 | Umezawa et al. |
| 7,322,892 B1 | 1/2008 | Watanabe et al. |
| 7,335,115 B1 | 2/2008 | Watanabe et al. |
| 7,344,454 B2 | 3/2008 | Umezawa et al. |
| 8,017,690 B2 | 9/2011 | Hirau et al. |
| 8,048,958 B2 * | 11/2011 | Hirau et al. .................... 525/129 |
| 8,409,034 B2 * | 4/2013 | Kamino et al. ............... 473/378 |
| 8,877,875 B2 * | 11/2014 | Kamino et al. ............... 525/458 |
| 2001/0018372 A1 | 8/2001 | Kasashima et al. |

(Continued)

FOREIGN PATENT DOCUMENTS

| | | |
|---|---|---|
| JP | 51-74726 | 6/1976 |
| JP | 58-2063 B2 | 1/1983 |

(Continued)

OTHER PUBLICATIONS

Werner Blank data sheet for HDI trimer; Jul. 2006.*
English translation of the Japanese Office Action for Application No. 2008-049606 dated Mar. 13, 2012.
Japanese Office Action for Application No. 2008-049606 dated Feb. 5, 2013 (with English translation).
Japanese Office Action for Application No. 2008-077742 dated Dec. 18, 2012 (with partial English translation).
Japanese Office Action for Application No. 2008-077955 dated Dec. 18, 2012 (with partial English translation).
United States Office Action for U.S. Appl. No. 12/366,415 dated Aug. 15, 2011.
United States Office Action for U.S. Appl. No. 12/366,415 dated Aug. 23, 2012.
United States Office Action for U.S. Appl. No. 12/366,415 dated Feb. 22, 2011.
United States Office Action for U.S. Appl. No. 12/391,702 dated Aug. 24, 2012.

(Continued)

*Primary Examiner* — David Buttner
(74) *Attorney, Agent, or Firm* — Birch Stewart Kolasch & Birch, LLP

(57) ABSTRACT

An object of the present invention is to provide a golf ball which is excellent in abrasion-resistance and durability. The golf ball of the present invention comprises a cover using a cover composition containing thermoplastic polyurethane (A) and a polyisocyanate mixture (B) in which a urethane prepolymer (b-1a) having at least two isocyanate groups or a polyisocyanate (b-1b) having at least three isocyanate groups is dispersed in a thermoplastic resin (b-2) which does not substantially react with the isocyanate groups.

8 Claims, No Drawings

(56) References Cited

U.S. PATENT DOCUMENTS

| | | |
|---|---|---|
| 2002/0077197 A1 | 6/2002 | Endo |
| 2002/0094886 A1 | 7/2002 | Sajima |
| 2003/0045375 A1 | 3/2003 | Sasaki et al. |
| 2003/0064831 A1 | 4/2003 | Ichikawa et al. |
| 2003/0064832 A1 | 4/2003 | Ichikawa et al. |
| 2003/0064833 A1 | 4/2003 | Ichikawa et al. |
| 2003/0064835 A1 | 4/2003 | Ichikawa et al. |
| 2004/0106473 A1 | 6/2004 | Hayashi et al. |
| 2004/0106474 A1 | 6/2004 | Hayashi et al. |
| 2004/0142771 A1 | 7/2004 | Sajima et al. |
| 2005/0113188 A1 | 5/2005 | Sajima |
| 2005/0181891 A1 | 8/2005 | Umezawa et al. |
| 2005/0187038 A1 | 8/2005 | Sasaki et al. |
| 2005/0250599 A1 | 11/2005 | Watanabe et al. |
| 2005/0288125 A1* | 12/2005 | Takesue et al. ............... 473/371 |
| 2006/0193934 A1 | 8/2006 | Aoyama et al. |
| 2006/0270492 A1 | 11/2006 | Higuchi et al. |
| 2006/0276596 A1 | 12/2006 | Hayashi et al. |
| 2007/0010351 A1 | 1/2007 | Umezawa et al. |
| 2007/0117655 A1 | 5/2007 | Kasashima et al. |
| 2007/0129174 A1 | 6/2007 | Higuchi |
| 2007/0142127 A1 | 6/2007 | Tarao |
| 2008/0045360 A1 | 2/2008 | Ohama et al. |
| 2008/0161134 A1 | 7/2008 | Tarao |
| 2009/0111608 A1 | 4/2009 | Watanabe et al. |
| 2009/0124420 A1 | 5/2009 | Kamino et al. |
| 2009/0124421 A1 | 5/2009 | Hirau et al. |
| 2009/0124430 A1 | 5/2009 | Hirau et al. |
| 2009/0221387 A1 | 9/2009 | Ohama et al. |
| 2009/0247326 A1 | 10/2009 | Ohama et al. |
| 2009/0247328 A1 | 10/2009 | Kamino et al. |

FOREIGN PATENT DOCUMENTS

| | | | |
|---|---|---|---|
| JP | 7-24085 A | 1/1995 | |
| JP | 2662909 B2 | 6/1997 | |
| JP | 9-215778 A | 8/1997 | |
| JP | 10-99469 A | 4/1998 | |
| JP | 10-127826 A | 5/1998 | |
| JP | 11-89967 A | 4/1999 | |
| JP | 11-137727 A | 5/1999 | |
| JP | 11-178949 A | 7/1999 | |
| JP | 2000-279553 A | 10/2000 | |
| JP | 2001-187172 A | 7/2001 | |
| JP | 2001-212260 A | 8/2001 | |
| JP | 2002-159598 A | 6/2002 | |
| JP | 2002-200196 A | 7/2002 | |
| JP | 2002-263219 A | 9/2002 | |
| JP | 2002-336378 A | 11/2002 | |
| JP | 2002-336379 A | 11/2002 | |
| JP | 2002-336380 A | 11/2002 | |
| JP | 2002-336381 A | 11/2002 | |
| JP | 2002-336386 A | 11/2002 | |
| JP | 2002-355342 A | 12/2002 | |
| JP | 2003-764 A | 1/2003 | |
| JP | 2003-70936 A | 3/2003 | |
| JP | 2004-16583 A | 1/2004 | |
| JP | 2004-97581 A | 4/2004 | |
| JP | 2004-180793 A | 7/2004 | |
| JP | 2004-180797 A | 7/2004 | |
| JP | 2004-305755 A | 11/2004 | |
| JP | 2005-103128 A | 4/2005 | |
| JP | 2005-110866 A | 4/2005 | |
| JP | 2005-224514 A | 8/2005 | |
| JP | 2005-230375 A | 9/2005 | |
| JP | 2005-253962 A | 9/2005 | |
| JP | 2005-319287 A | 11/2005 | |
| JP | 2006-344 A | 1/2006 | |
| JP | 2007-136173 A | 6/2007 | |
| JP | 2007-159997 A | 6/2007 | |
| JP | 2008-43618 A | 2/2008 | |
| JP | 2009/201896 A | 9/2009 | |
| JP | 2009-226115 A | 10/2009 | |
| JP | 2009-226122 A | 10/2009 | |

OTHER PUBLICATIONS

United States Office Action for U.S. Appl. No. 12/391,702 dated Aug. 5, 2011.
United States Office Action for U.S. Appl. No. 12/393,785 dated Aug. 12, 2011.
United States Office Action for U.S. Appl. No. 12/393,785 dated Aug. 23, 2012.
Japanese Office Action with the English translation dated Aug. 16, 2011 for Application No. 2007-190111.
Japanese Office Action with the English translation dated Aug. 16, 2011 for Application No. 2007-190112.
Notice of Allowance for corresponding U.S. Appl. No. 12/003,598 dated Sep. 4, 2012.
Office Action for corresponding U.S. Appl. No. 12/003,598 dated Aug. 31, 2010.
Office Action for corresponding U.S. Appl. No. 12/003,598 dated Feb. 23, 2011.
Office Action for corresponding U.S. Appl. No. 12/003,598 dated Jul. 8, 2010.
Office Action for corresponding U.S. Appl. No. 12/003,598 dated May 7, 2012.
Office Action for corresponding U.S. Appl. No. 12/289,956 dated Sep. 27, 2012.
Advisory Action dated Jun. 12, 2012 for corresponding U.S. Appl. No. 12/289,953.
Advisory Action dated May 18, 2012 for corresponding U.S. Appl. No. 12/289,956.
Final Office Action dated Feb. 27, 2012 for corresponding U.S. Appl. No. 12/289,956.
HDI isocyanurate trimer CAS # 3779-63-3, http://www.wernerblank.com/polyur/chemistry/isocyanate/cas3779633.htm, 1 page, 2006.
Japanese Office Action for Japanese Patent Application No. 2008-109169 dated Mar. 13, 2012.
Japanese Office Action with English translation dated Aug. 21, 2012, for Application No. 2007-291124.
Japanese Office Action with English translation dated Aug. 21, 2012, for Application No. 2007-291125.
Japanese Office Action with English translation dated Aug. 21, 2012, for Application No. 2007-291126.
Japanese Office Action with the English translation dated Nov. 8, 2011, for Application No. 2007-190111.
Japanese Office Action with the English translation dated Nov. 8, 2011, for Application No. 2007-190112.
Japanese Office Action with the English translation dated Nov. 8, 2011, for Application No. 2007-291124.
Japanese Office Action with the English translation dated Nov. 8, 2011, for Application No. 2007-291125.
Japanese Office Action with the English translation dated Nov. 8, 2011, for Application No. 2007-291126.
Notice of Allowance for corresponding U.S. Appl. No. 12/289,957 dated May 10, 2011.
Office Action for corresponding U.S. Appl. No. 12/289,953 dated Apr. 27, 2011.
Office Action for corresponding U.S. Appl. No. 12/289,956 dated Apr. 29, 2011.
US Office Action dated Jan. 13, 2012 for U.S. Appl. No. 12/418,179.
US Office Action, dated Oct. 14, 2011, for U.S. Appl. No. 12/289,953.
US Office Action, dated Oct. 21, 2011, for U.S. Appl. No. 12/289,956.

* cited by examiner

GOLF BALL

CROSS REFERENCE

The present application is a 37 C.F.R. §1.53(b) divisional of, and claims priority to, U.S. application Ser. No. 12/003,598, filed Dec. 28, 2007, now U.S. Pat. No. 8,349,952. Priority is also claimed to Japanese Application No. 2006-356547 filed on Dec. 28, 2006, to Japanese Application No. 2006-356548 filed on Dec. 28, 2006, to Japanese Application No. 2007-190111 filed on Jul. 20, 2007, and to Japanese Application No. 2007-190112 filed on Jul. 20, 2007. The entire contents of each of these applications is hereby incorporated by reference.

FIELD OF THE INVENTION

The present invention relates to a golf ball, more particularly to improving abrasion-resistance and durability of a golf ball having a urethane cover.

DESCRIPTION OF THE RELATED ART

As a base resin constituting a cover of a golf ball, an ionomer resin or polyurethane is used. Covers containing ionomer resins are widely used for their excellent resilience, durability, workability and the like. However, because of their high rigidity and hardness, problems such as bad shot feeling, inadequate spin performance and poor controllability are pointed out. On the other hand, the polyurethane is used as a base resin constituting the cover since it provides an improved shot feeling and spin properties compared with an ionomer resin. For example, Japanese patent publication No. S51-74726, Japanese patent No. 2662909 and U.S. Pat. No. 4,123,061 disclose a use of thermosetting polyurethane for a cover, and U.S. Pat. Nos. 3,395,109 and 4,248,432 disclose a use of thermoplastic polyurethane for a cover. Although a golf ball having excellent abrasion-resistance can be obtained when the thermosetting polyurethane is used for a cover, a process of preparing a golf ball will be complicated. Additionally, a golf ball using the thermoplastic polyurethane for a cover is insufficient in abrasion-resistance and durability compared with the golf ball using the thermosetting polyurethane.

Examples of a technology for improving a cover using the thermoplastic polyurethane include Japanese patent publication Nos. H11-178949, 2002-336378, 2002-336380, 2002-336386, and 2005-253962. Japanese patent publication No. H11-178949 discloses a solid golf ball comprising a solid core and a cover covering the solid core, wherein a resin component forming the cover comprises a reaction product of a thermoplastic polyurethane elastomer and blocked isocyanate as a main component. Additionally, Japanese patent publication Nos. 2002-336378, 2002-336380 and 2002-336386 disclose golf balls having a cover made from a composition containing a thermoplastic polyurethane material and an isocyanate mixture in which an isocyanate compound having two functional groups in a molecule is dispersed in a thermoplastic resin which does not substantially react with an isocyanate.

Japanese patent publication No. 2005-253962 discloses a golf ball having a cover comprising, as a main component, a mixture of a thermoplastic resin composition, an isocyanate compound or an isocyanate mixture having two isocyanate groups in a molecule as functional groups and a thermoplastic polyurethane elastomer, wherein the thermoplastic resin composition is selected from the group consisting of a thermoplastic block copolymer, a polyester elastomer, a polyamide elastomer, and polyolefin, and is modified with a functional group having reactivity with an isocyanate.

SUMMARY OF THE INVENTION

Japanese patent publication Nos. 11-178949, 2002-336378, 2002-336380, 2002-336386, and 2005-253962 merely disclose bifunctional isocyanate compounds having a low-molecular weight. However, as specifically disclosed in Japanese patent publication Nos. 11-178949, 2002-336378, 2002-336380, 2002-336386, and 2005-253962, in technology using a polyisocyanate mixture in which the bifunctional isocyanate compound is dispersed in a thermoplastic resin, the crosslinking density of the resultant cover is low so that abrasion-resistance is not always sufficient. Additionally, there has been a problem in that if an amount of the polyisocyanate compound is increased in order to enhance crosslinking density of the resultant cover, the abrasion-resistance of the cover adversely becomes lower due to an accompanying increase of a content of a thermoplastic component which is poor in abrasion-resistance. The present invention has been achieved in view of the above circumstances. An object of the present invention is to provide a golf ball which is excellent in abrasion-resistance and durability.

The present invention has solved the above problems and provides a golf ball having a cover and a core, wherein the cover is made from a cover composition containing, as a resin component, a thermoplastic polyurethane (A) and a polyisocyanate mixture (B) in which a urethane prepolymer (b-1a) having at least two isocyanate groups is dispersed in a thermoplastic resin (b-2) which does not substantially react with the isocyanate groups.

Namely, in the present invention, the thermoplastic polyurethane (A) is crosslinked using the polyisocyanate mixture (B) in which the urethane prepolymer (b-1a) having a high-molecular weight compared with a diisocyanate compound having a low-molecular weight is dispersed in the thermoplastic resin (b-2) which does not substantially react with the isocyanate groups, so that the resultant cover does not become too hard and a large improving effect on abrasion-resistance and durability can be obtained.

The present invention further provides a golf ball having a cover and a core, wherein the cover is made from a cover composition containing, as a resin component, a thermoplastic polyurethane (A) and a polyisocyanate mixture (B) in which a polyisocyanate (b-1b) having at least three isocyanate groups is dispersed in a thermoplastic resin (b-2) which does not substantially react with the isocyanate groups.

Namely, in the present invention, the thermoplastic polyurethane (A) is crosslinked using the polyisocyanate mixture (B) in which the polyisocyanate (b-1b) having at least three isocyanate groups is dispersed in the thermoplastic resin (b-2) which does not substantially react with the isocyanate groups, so that a crosslinking density of the resultant cover can be enhanced efficiently. As a result, it is not necessary to blend an excessive amount of the polyisocyanate mixture (B) in the thermoplastic polyurethane (A) to obtain a golf ball which is excellent in abrasion-resistance and durability. Additionally, a golf ball which is even more excellent in abrasion-resistance and durability can be obtained by increasing an amount of the polyisocyanate mixture (B) blended in the thermoplastic polyurethane (A).

According to the present invention, the abrasion-resistance and durability of the resultant golf ball is improved.

DESCRIPTION OF THE PREFERRED EMBODIMENT

The present invention provides a golf ball having a core and a cover, wherein the cover is made from a cover composition containing, as a resin component, the thermoplastic polyurethane (A) and the polyisocyanate mixture (B) in which the urethane prepolymer (b-1a) having at least two isocyanate groups or the polyisocyanate (b-1b) having at least three isocyanate groups is dispersed in the thermoplastic resin (b-2) which does not substantially react with the isocyanate groups. Hereinafter, the present invention will be explained in detail.

First, the thermoplastic polyurethane (A) will be explained. The thermoplastic polyurethane (A) used in the present invention is not particularly limited as long as it has a plurality of urethane bonds in a molecule and exhibits thermoplasticity. For example, the thermoplastic polyurethane is a reaction product obtained by reacting a polyisocyanate with a polyol to form urethane bonds in a molecule thereof, where necessary, obtained by further carrying out a chain extension reaction with a polyol, a polyamine or the like having a low-molecular weight.

The polyisocyanate component, which constitutes the thermoplastic polyurethane (A) is not limited as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the thermoplastic polyurethane (A). A use of the aromatic polyisocyanate improves the mechanical property of the obtained polyurethane and provides the cover with the excellent abrasion-resistance. In addition, in view of improving the weather resistance, as the polyisocyanate component of the thermoplastic polyurethane (A), a non-yellowing type polyisocyanate such as TMXDI, XDI, HDI, $H_6$XDI, IPDI, $H_{12}$MDI and NBDI is preferably used. More preferably, 4,4'-dicyclohexylmethane diisocyanate ($H_{12}$MDI) is used. Since 4,4'-dicyclohexylmethane diisocyanate ($H_{12}$MDI) has a rigid structure, the mechanical property of the resulting polyurethane is improved, and thus the cover which is excellent in abrasion-resistance can be obtained.

The polyol component constituting the thermoplastic polyurethane (A) is not particularly limited as long as it has a plurality of hydroxyl groups, and such examples include a low-molecular weight polyol and a high-molecular weight polyol. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, 1,6-cyclohexanedimethylol, an aniline diol, and bisphenol A diol; a triol such as glycerin, trimethylol propane, and hexanetriol; a tetraol or a hexanol such as pentaerythritol and sorbitol. Examples of the high-molecular weight polyol include a polyether polyol such as polyoxyethylene glycol (PEG), polyoxypropylene glycol (PPG), and polyoxytetramethylene glycol; a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them.

A number average molecular weight of the high-molecular weight polyol is not particularly limited, and for example, it is preferably 400 or more, more preferably 1,000 or more. If the number average molecular weight of the high-molecular weight polyol is too small, the resultant polyurethane becomes too hard and the shot feeling of the golf ball is lowered. The upper limit of the number average molecular weight of the high molecular weight polyol is not particularly limited, and it is preferably 10,000, more preferably 8,000.

The polyamine that constitutes the thermoplastic polyurethane where necessary may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The thermoplastic polyurethane (A) has no limitation on the constitutional embodiments thereof. Examples of the constitutional embodiments are the embodiment where the polyurethane consists of the polyisocyanate component and the high-molecular weight polyol; the embodiment where the polyurethane consists of the polyisocyanate component, the high-molecular weight polyol and the low-molecular weight polyol; and the embodiment where the polyurethane consists of the polyisocyanate component, the high-molecular weight polyol, the low-molecular weight polyol, and the polyamine; and the embodiment where the polyurethane consists of the polyisocyanate component, the high-molecular weight polyol and the polyamine.

Next, the polyisocyanate mixture (B) in which the urethane prepolymer (b-1a) having at least two isocyanate groups is dispersed in the thermoplastic resin (b-2) which does not substantially react with the isocyanate groups will be explained.

The urethane prepolymer (b-1a) is not particularly limited as long as it is a compound having a plurality of urethane bonds in a molecule thereof and two or more isocyanate groups, and having lower molecular weight than that of the thermoplastic polyurethane (A). Such examples include an isocyanate group-terminated urethane prepolymer having urethane bonds formed in a molecule thereof by, for example, reacting a polyisocyanate and a polyol under a condition wherein the polyisocyanate is in excess. The blending ratio of the polyisocyanate component to the polyol component is preferably 1.1 or more, more preferably 1.3 or more, even more preferably 1.5 or more, and preferably 3.0 or less, more preferably 2.5 or less, even more preferably 2.0 or less in a molar ratio (NCO/OH) of the isocyanate group (NCO) of the polyisocyanate component to the hydroxyl group (OH) of the polyol component.

The polyisocyanate component used as a raw material for the urethane prepolymer (b-1a) is not limited, as long as the polyisocyanate has at least two isocyanate groups. Examples of the polyisocyanate component include polyisocyanates exemplified as the polyisocyanate constituting the thermoplastic polyurethane (A). The polyol component used as a raw material for the urethane prepolymer (b-1a) is not limited, as long as the polyol component has a plurality of hydroxyl groups. Examples of the polyol component include polyols such as a high-molecular weight polyol and a low-molecular weight polyol exemplified as the polyol component constituting the thermoplastic polyurethane (A).

The isocyanate group-terminated urethane prepolymer used as the urethane prepolymer (b-1a) includes TDI based urethane prepolymer, MDI based urethane prepolymer, and $H_{12}$MDI based urethane prepolymer. Preferably used is MDI based urethane prepolymer or $H_{12}$MDI urethane prepolymer. Herein, TDI based urethane prepolymer means an isocyanate group terminated urethane prepolymer obtained by reacting TDI or a polyisocyanate compound containing TDI as a main component with a polyol (preferably PTMG); MDI based urethane prepolymer means an isocyanate group terminated urethane prepolymer obtained by reacting MDI or a polyisocyanate compound containing MDI as a main component with a polyol (preferably PTMG), and $H_{12}$MDI urethane prepolymer means an isocyanate group terminated urethane prepolymer obtained by reacting $H_{12}$MDI or a polyisocyanate compound containing $H_{12}$MDI with a polyol (preferably PTMG).

For a reaction between the polyisocyanate component and the polyol component, a catalyst which is publicly known for being used in the urethane reaction can be used. Examples of the catalyst include a monoamine such as triethylamine and N,N-dimethylcyclohexylamine; a polyamine such as N,N,N',N'-tetramethylethylenediamine and N,N,N',N'',N''-pentamethyldiethylenetriamine; a cyclic diamine such as 1,8-diazabicyclo[5,4,0]-7-undecene (DBU) and triethylenediamine; a tin catalyst such as dibutyltin dilaurylate and dibutyltin diacetate; an organic carboxylic acid such as acetic acid, azelaic acid, oleic acid and adipic acid.

The urethane prepolymer preferably has NCO content (NCO %) of 0.1 mass % or more, more preferably 0.2 mass % or more, even more preferably 0.3 mass % or more, and preferably has NCO content (NCO %) of 7.0 mass % or less, more preferably 5.0 mass % or less. If the urethane prepolymer has too low NCO content, the effect of the improvement may be little and the abrasion-resistance may also become worse, while if the urethane prepolymer has too high NCO content, the viscosity of the cover composition may increase to excess, resulting in lowering the moldability. NCO content (NCO %) of the urethane prepolymer (b-1a) is defined as 100×[number of moles of the isocyanate group in the urethane prepolymer (b-1a)×42 (molecular weight of NCO)]/[total amount (g) of the urethane prepolymer (b-1a)]

A number average molecular weight of the urethane prepolymer (b-1a) is preferably, for example, 1000 or more, more preferably 1500 or more, even more preferably 2000 or more, and preferably 30000 or less, more preferably 20000 or less, even more preferably 10000 or less. If the number average molecular weight is 1000 or more, a distance between crosslinking points at a time of crosslinking reaction becomes longer, so that the resultant polyurethane cover does not become too hard, thereby improving durability thereof. On the other hand, if the number average molecular weight is more than 30000, crosslinking density becomes low, so that abrasion-resistance of the resultant cover may be lowered.

The polyisocyanate component and the polyol component constituting the urethane prepolymer may be suitably selected from the components described above as the components constituting the thermoplastic polyurethane (A).

The number average molecular weight of the polyol component constituting the urethane prepolymer (b-1a) is preferably 650 or more, more preferably 700 or more, even more preferably 800 or more, and preferably 10,000 or less, more preferably 5,000 or less, even more preferably 3,000 or less. If the number average molecular weight is 650 or more, a distance between crosslinking points at a time of crosslinking reaction becomes longer, so that the resultant polyurethane cover does not become too hard, and the durability thereof is improved. On the other hand, if the number average molecular weight is more than 10,000, crosslinking density becomes low, so that the abrasion-resistance of the resultant cover may be lowered. The number average molecular weight of the urethane prepolymer (b-1a) or the polyol component can be measured by Gel permeation Chromatography using two columns of TSK-GEL SUPREH 2500 (TOSOH Corporation) as a column, polystyrene as a standard material, and tetrahydrofuran as an eluate.

The functional number of the isocyanate group of the urethane prepolymer (b-1a) used in the present invention is not particularly limited as long as it is at least two, and may be, for example, trifunctional or tetrafunctional. A polyfunctional urethane prepolymer which is at least trifunctional can be obtained by using at least a trifunctional polyol or polyisocyanate as the ones constituting the urethane prepolymer.

Examples of the trifunctional or more than trifunctional polyisocyanate include a trifunctional isocyanate such as polymeric MDI, triphenyl methane triisocyanate, tris(isocyanate phenyl)thiophosphate, lysin ester triisocyanate, 1,6,11-undecane triisocyanate, 1,8-diisocyanate-4-isocyanate methyloctane, 1,3,8-hexamethylene triisocyanate, and bicycloheptane triisocyanate; isocyanurate of diisocyanate; an adduct obtained by reacting diisocyanate with a triol having a low-molecular weight such as trimethylol propane or glycerin (free diisocyanate are preferably removed from the adduct); an allophanate modified polyisocyanate; a biuret modified polyisocyanate, and the like. The allophanate modified polyisocyanate is, for example, a trifunctional polyisocyanate obtained by reacting diisocyanate with a diol having a low-molecular weight to form a urethane bond and further reacting the urethane bond with the diisocyanate, and the biuret modified polyisocyanate is, for example, a trifunctional polyisocyanate obtained by reacting a diisocyanate with a diamine having a low-molecular weight to form a urea bond and further reacting the urea bond with the diisocyanate.

Among them, in the present invention, it is a preferred embodiment to use a bifunctional isocyanate group-terminated urethane prepolymer represented by the formula (1).

Polyisocyanate-(polyol-polyisocyanate)$_n$ (1)

In the formula (1), a linking number n is preferably 1 or more and 10 or less, more preferably 5 or less, even more preferably 4 or less, further preferably 3 or less. If the linking number n is 1 or more, a distance between crosslinking points at the time of crosslinking reaction becomes longer, so that the resultant polyurethane cover does not become too hard, and the durability thereof is improved. On the other hand, if the linking number n is more than 5, the crosslink density becomes low, so that the abrasion-resistance of the resultant cover may be lowered.

Next, the polyisocyanate mixture (B) in which the polyisocyanate (b-1b) having at least three isocyanate groups is dispersed in the thermoplastic resin (b-2) which does not substantially react with the isocyanate groups will be explained.

Examples of the polyisocyanate (b-1b) having at least three isocyanate groups include a trifunctional isocyanate such as polymeric MDI, triphenyl methane triisocyanate, tris(isocyanate phenyl)thiophosphate, lysin ester triisocyanate, 1,6,11-undecane triisocyanate, 1,8-diisocyanate-4-isocyanate methyloctane, 1,3,6-hexamethylene triisocyanate, and bicycloheptane triisocyanate; isocyanurate of diisocyanate; an adduct obtained by reacting diisocyanate with a triol having a low-molecular weight such as trimethylol propane or glycerin (free diisocyanate are preferably removed from the adduct); an allophanate modified polyisocyanate; a biuret modified polyisocyanate, and the like. The allophanate modified polyisocyanate is, for example, a trifunctional polyisocyanate obtained by reacting diisocyanate with a diol having a low-molecular weight to form a urethane bond and further reacting the urethane bond with the diisocyanate, and the biuret modified polyisocyanate is, for example, a trifunctional polyisocyanate obtained by reacting a diisocyanate with a diamine having a low-molecular weight to form a urea bond and further reacting the urea bond with the diisocyanate.

The diisocyanate constituting the isocyanurate, the adduct, the biuret modified polyisocyanate or the allophanate modified polyisocyanate is not particularly limited, and includes 2,4-toluene diisocyanate, 2,6-tolylene diisocyanate, 4,4'-diphenylmethane diisocyanate (MDI), 1,5-naphthalene diisocyanate, 2,6-naphthalene diisocyanate, m-phenylene diisocyanate, p-phenylene diisocyanate, tetramethylene diisocyanate, 3,3'-dimethyl-4,4'-biphenylene diisocyanate, 3,3'-dimethoxy-4,4'-biphenylene diisocyanate, xylylene diisocyanate (XDI), tetramethylxylylenediisocyanate (TMXDI), 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), norbornene diisocyanate (NBDI), 4,4'-diisocyanate diphenyl ether, 1,3-diisocyanate methylcyclohexane, 1,4-diisocyanate methylcyclohexane, 1,4'-diisocyanate cyclohexane, and the like.

Among them, an isocyanurate of diisocyanate is preferable as the polyisocyanate (b-1b), and for example, an isocyanurate of isophorone diisocyanate, hexamethylene diisocyanate or hydrogenated xylylenediisocyanate is more preferable. The polyisocyanate (b-1b) may be used alone or as a combination of two or more.

The polyisocyanate (b-1b) preferably has NCO content (NCO %) of 1.5 mass % or more, more preferably 2.0 mass % or more, even more preferably 5.0 mass % or more, and preferably has NCO content (NCO %) of 30.0 mass % or less, more preferably 27.0 mass % or less, even more preferably 25.0 mass % or less. If the polyisocyanate (b-1b) has too low NCO content, the effect of the improvement may be little and the abrasion-resistance may also become worse, while if the polyisocyanate (b-1b) has too high NCO content, the viscosity of the cover composition may increase to excess, resulting in lowering the moldability. NCO content (NCO %) of the polyisocyanate (b-1b) is defined as 100×[number of moles of the isocyanate group in the polyisocyanate (b-1b)×42 (molecular weight of NCO)]/[total amount (g) of the polyisocyanate (b-1b)].

In a preferred embodiment, the polyisocyanate (b-1b) preferably has a low molecular weight. The number average molecular weight of the polyisocyanate (b-1b) is preferably, for example, 200 or more, more preferably 500 or more, even more preferably 800 or more, and preferably 2500 or less, more preferably 2000 or less, even more preferably 1500 or less. The number average molecular weight of the polyisocyanate (b-1b) can be measured by Gel permeation Chromatography using two columns of TSK-GEL SUPREH 2500 (TOSOH Corporation) as a column, polystyrene as a standard material, and tetrahydrofuran as an eluate.

When the polyisocyanate (b-1b) having at least three isocyanate groups is synthesized, a compound having only one or two isocyanate groups may be synthesized at the same time as a byproduct. In such a case, a percentage of the polyisocyanate having three or more isocyanate groups is preferably 70 mass % or more, more preferably 80 mass % or more, even more preferably 90 mass % or more based on 100 mass % of a total amount. If the percentage of the polyisocyanate having at least three isocyanate groups is less than 70 mass % with respect to the total amount, a sufficient crosslinking effect may not be obtained.

The thermoplastic resin (b-2) which does not substantially react with the isocyanate groups is not particularly limited as long as it is substantially inactive with an isocyanate group (That is, the thermoplastic resin (b-2) does not substantially have an active hydrogen reactive with an isocyanate group), and such examples include a polystyrene resin, a polyvinylchloride resin, an acrylic resin, an ABS resin, an ester rubber, a polycarbonate resin, a polyester resin (preferably polyethylene terephthalate), polyolefin, polyacetal, a difluoride resin, a tetrafluoride resin, and an ionomer resin. Among them, as the thermoplastic resin (b-2), a thermoplastic elastomer having rubber elasticity is preferable. For example, it is preferred to use at least one kind selected from the group consisting of a polyester elastomer, an acrylic elastomer, a styrene elastomer, an olefin elastomer, and a vinyl chloride elastomer. Examples of the polyester elastomer include "HYTREL such as "HYTREL 3046", "HYTREL 3548" and "HYTREL 4047" manufactured by DU PONT-TORAY Co, and examples of the styrene elastomer include "Rabalon" manufactured by Mitsubishi Chemical Corporation.

In the polyisocyanate mixture, a blending ratio of the urethane prepolymer (b-1a) or the polyisocyanate (b-1b) to the thermoplastic resin (b-2) (a total of 100 mass %) is preferably: the urethane prepolymer (b-1) or the polyisocyanate (b-1b)/thermoplastic resin (b-2)=5 mass % to 50 mass %/50 mass % to 95 mass %, more preferably 10 mass % to 50 mass %/50 mass % to 90 mass %, even more preferably 20 mass % to 45 mass %/55 mass % to 80 mass %. If the blending ratio is outside the above range, a desired cross-linked structure may not be obtained, or crosslinking density may become too high, so that durability may be undermined.

NCO content (NCO %) of the polyisocyanate mixture (B) is defined as 100×[number of moles of the isocyanate group in the polyisocyanate mixture (B)×42 (molecular weight of NCO)]/[total amount (g) of the polyisocyanate mixture (B)]. The polyisocyanate mixture (B) containing the urethane prepolymer (b-1a) preferably has NCO content (NCO %) of 0.1 mass % or more, more preferably 0.2 mass % or more, even more preferably 0.3 mass % or more, and preferably has NCO content (NCO %) of 10 mass % or less, more preferably 7.0 mass % or less, even more preferably 5.0 mass % or less. The polyisocyanate mixture (B) containing the polyisocyanate (b-1b) preferably has NCO content (NCO %) of 5.0 mass % or more, more preferably 7.0 mass % or more, even more preferably 8.5 mass % or more, and preferably has NCO content (NCO %) of 30.0 mass % or less, more preferably 20.0 mass % or less, even more preferably 12.0 mass % or less.

If the NCO content (NCO %) of the polyisocyanate mixture (B) is too low, the effect of the abrasion-resistance may not be obtained due to the small degree of the crosslinking, while if the NCO content (NCO %) is too high, the moldability may be lowered because of the high viscosity of the cover composition.

The cover composition used in the present invention preferably contains the polyisocyanate mixture (B) in an amount of 1 part by mass or more, more preferably 3 parts by mass or more, even more preferably 5 parts by mass or more, and preferably 50 parts by mass or less, more preferably 30 parts by mass or less, even more preferably 20 parts by mass or less based on 100 parts by mass of the thermoplastic polyurethane (A). If the polyisocyanate mixture (B) is outside the above range, a sufficient cross-linked structure may not be obtained, or crosslinking density may become too high, so that durability may be undermined.

The cover composition used in the present invention preferably contains, as the base resin component, the thermoplastic polyurethane (A) and the polyisocyanate mixture (B) in which the urethane prepolymer (b-1a) having at least two isocyanate groups or the polyisocyanate (b-1b) having at least three isocyanate groups is dispersed in the thermoplastic resin (b-2) which does not substantially react with the isocyanate groups. Herein, the base resin component means a component included preferably in a proportion of 50 mass % or more, more preferably 60 mass % or more, even more preferably 70 mass % or more based on 100% of total resin components included in the cover composition. It is also a preferred embodiment that the cover composition used in the present invention, as the base resin components, consists of the thermoplastic polyurethane (A) and the polyisocyanate mixture (B), the polyisocyanate mixture (B) obtained by dispersing the urethane prepolymer (b-1a) having at least two isocyanate groups or the polyisocyanate (b-1b) having at least three isocyanate groups in the thermoplastic resin (b-2) which does not substantially react with the isocyanate groups.

In the present invention, as the resin component of the cover composition, other resin components that can be used without damaging the effects of the present invention include, for example, an ionomer resin and a thermoplastic elastomer. Examples of the ionomer resin include one prepared by neutralizing at least a part of carboxyl groups in a copolymer composed of ethylene and $\alpha,\beta$-unsaturated carboxylic acid having 3 to 8 carbon atoms with a metal ion, one prepared by neutralizing at least a part of carboxyl groups in a ternary copolymer composed of ethylene, $\alpha,\beta$-unsaturated carboxylic acid having 3 to 8 carbon atoms, and $\alpha,\beta$-unsaturated carboxylic acid ester with a metal ion, or a mixture thereof. The specific examples of the ionomer resin include Himilan available from MITSUI-DUPONT POLYCHEMICAL, Surlyn available from DUPONT CO., and Iotek available from ExxonMobil Corp. The specific examples of the thermoplastic elastomer include a thermoplastic polyamide elastomer having a commercial name of "PEBAX", for example, "PEBAX 2533" available from ARKEMA Inc, a thermoplastic polyester elastomer having a commercial name of "HYTREL", for example, "HYTREL 3548", and "HYTREL 4047" available from DU PONT-TORAY Co., and a thermoplastic polystyrene elastomer having a commercial name of "Rabalon" available from Mitsubishi Chemical Co.

The cover composition used in the golf ball of the present invention may contain, other than the above-mentioned resin component, a pigment component such as titanium oxide and a blue pigment, a gravity adjusting agent such as calcium carbonate and barium sulfate, a dispersant, an antioxidant, an ultraviolet absorber, a light stabilizer, a fluorescent material or a fluorescent brightener to the extent that the cover performance is not damaged.

The content of the white pigment (titanium oxide) is preferably 0.5 part by mass or more, more preferably 1 part by mass or more, and preferably 10 parts by mass or less, more preferably 8 parts by mass or less based on 100 parts by mass of the base resin constituting the cover. The white pigment in an amount of 0.5 part by mass or more can impart opacity to the cover, while the white pigment in an amount of more than 10 parts by mass may lower the durability of the resulting cover.

In the method for preparing the golf ball of the present invention, the thermoplastic polyurethane (A) and the polyisocyanate mixture (B) in which the urethane prepolymer (b-1a) or the polyisocyanate (b-1b) is dispersed in the thermoplastic resin (b-2) which does not substantially react with the isocyanate groups are blended to obtain a cover composition. The blending of the cover composition is preferably carried out using, for example, a mixer capable of blending a raw material in the form of pellet, more preferably a tumbler type mixer. An embodiment of blending the cover composition include, for example, an embodiment of mixing an additive for the cover such as titanium oxide with the thermoplastic polyurethane (A) and subjecting the resultant mixture to extrusion to prepare a white pellet in advance, and then dry-blending the white pellet and the pellet of the polyisocyanate mixture (B); an embodiment of mixing the thermoplastic polyurethane (A), the polyisocyanate mixture (B) and the additive for a cover such as titanium oxide, and subjecting the resultant mixture to extrusion to prepare a white pellet in advance; and an embodiment of mixing the polyisocyanate mixture (B) and the additive for a cover such as titanium oxide and subjecting the resultant mixture to extrusion to prepare a white pellet in advance, and dry-blending the white pellet and a pellet of the thermoplastic polyurethane (A).

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding. In the case that the cover composition is subjected to direct injection molding onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold. The crosslinking can be further proceeded by post-curing the golf ball having the molded cover at the temperature of 40° C. or more for 4 to 96 hours.

In the present invention, use of the thermoplastic polyurethane (A) and the polyisocyanate mixture (B) suppresses the crosslinking reaction when molding the cover, and promotes the crosslinking reaction after molding the cover, thereby improving the abrasion-resistance of the cover without scarifying the productivity of the golf ball. The crosslinking of the cover can be confirmed by the following method.

The thermoplastic polyurethane (A) crosslinked with the polyisocyanate mixture (B) is insoluble in the solvent in which the linear thermoplastic polyurethane (A) is soluble. The solvent in which the linear thermoplastic polyurethane (A) is soluble includes, for example, N,N-dimethylformamide (DMF), tetrahydrofuran (THF) or the like. Namely, the thermoplastic polyurethane without being crosslinked is readily soluble in the solvent, but the thermoplastic polyurethane crosslinked with the polyisocyanate mixture (B) is insoluble in the solvent. According to this difference, it is possible to confirm whether the thermoplastic polyurethane is crosslinked or not.

Further, the thermoplastic polyurethane crosslinked with the polyisocyanate mixture (B) has an allophanate bond or a biuret bond formed. These bonds are weaker than the urethane bond or the urea bond which constitute the main molecular chain of the thermoplastic polyurethane. Accordingly, the allophanate bond or a biuret bond forming the crosslinking structure can be broken by a treatment with a DMF solution of n-butylamine or a heat treatment.

The DMF solution of n-butyl amine preferably has a concentration of 0.01 mol/l to 0.25 mol/l, more preferably 0.05 mole/l.

The heat treatment is preferably conducted at the temperature of 130 to 150° C. for 2 to 4 hours.

In addition, it is possible to confirm what kind of the polyisocyanate mixture crosslinks the thermoplastic polyurethane, by analyzing the product which is treated with the DMF solution of n-butyl amine or treated with heat, using gel permeation chromatography (GPC), Fourier transform infrared spectrophotometer (FT-IR), nuclear magnetic resonance apparatus (NMR) or the like.

After the cover is molded, the mold is opened and the golf ball body is taken out from the mold, and as necessary, the golf ball body is preferably subjected to surface treatment such as deburring, cleaning, and sandblast. If desired, a paint film or a mark may be formed.

In the present invention, the golf ball preferably has the cover with a thickness of 2.0 mm or less, more preferably 1.6 mm or less, even more preferably 1.0 mm or less. If the thickness is 2.0 mm or less, the resilience of the golf ball will become higher and a total flying distance will become longer. The lower limit of the thickness of the cover is, for example, but not limited to, 0.1 mm. If the thickness is less than 0.1 mm, the molding of the cover may become difficult.

The slab hardness of the cover for the golf ball of the present invention is preferably 20 or more, more preferably 25 or more, even more preferably 30 or more, and preferably 60 or less, more preferably 55 or less, even more preferably 50 or less in shore D hardness. If the slab hardness of the cover is 20 or more, the golf ball excellent in the resilience (flying distance) and spin performance can be obtained. On the other hand, if the slab hardness is 60 or less, the shot feeling of the golf ball when hitting the ball can be enhanced. Herein, the slab hardness of the cover means a hardness obtained by measuring the hardness of the cover composition molded into the sheet shape. The details of the method to measure the slab hardness is described later.

Next, a preferred embodiment of the core of the golf ball of the present invention will be explained.

The core of the golf ball of the present invention includes a single-layered core, a core consisting of a center and a single-layered intermediate layer covering the core, a core consisting of a center and a plurality of intermediate layers, or a core consisting of a center and a multi-layered intermediate layers. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

As the core or the center of the golf ball of the present invention, a conventionally known rubber composition (hereinafter simply referred to as "rubber composition for the core" occasionally) may be employed, and it can be molded by, for example, heat-pressing a rubber composition containing a base rubber, a crosslinking initiator, a co-crosslinking agent, and a filler. The core preferably has a spherical shape. Unless the core has a spherical shape, the cover has non-uniform thickness. As a result, there exist some portions where the performance of the cover is lowered.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of co-crosslinking agent needs to be increased in order to obtain an appropriate hardness, so that the resilience tends to be insufficient.

The co-crosslinking agent is not particularly limited as long as it has the effect of crosslinking a rubber molecule by graft polymerization with a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience. The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the rubber composition for the core is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the rubber composition for the core, an organic sulfur compound, an antioxidant or a peptizing agent may be blended as appropriate in addition to the base rubber, the crosslinking initiator, the co-crosslinking agent and the filler As the organic sulfur compound, a diphenyl disulfide or a derivative thereof may be preferably used. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber. Examples of the diphenyl disulfide or the derivative thereof include diphenyl disulfide, a mono-substituted diphenyl disulfide such as bis (4-chlorophenyl) disulfide, bis(3-chlorophenyl) disulfide, bis(4-bromophenyl) disulfide, bis(3-bromophenyl) disulfide, bis(4-fluorophenyl) disulfide, bis(4-iodophenyl) disulfide and bis (4-cyanophenyl) disulfide; a di-substituted diphenyl disulfide such as bis(2,5-dichlorophenyl) disulfide, bis (3,5-dichlorophenyl) disulfide, bis(2,6-dichlorophenyl) disulfide, bis(2,5-dibromophenyl) disulfide, bis (3,5-dibromophenyl) disulfide, bis(2-chloro-5-bromophenyl) disulfide, and bis(2-cyano-5-bromophenyl) disulfide; a tri-substituted diphenyl disulfide such as bis (2,4,6-trichlorophenyl) disulfide, and bis (2-cyano-4-chloro-6-bromophenyl) disulfide; a tetra-substituted diphenyl disulfide such as bis (2,3,5,6-tetra chlorophenyl) disulfide; a penta-substituted diphenyl disulfide such as bis(2,3,4,5,6-pentachlorophenyl) disulfide and bis(2,3,4,5,6-pentabromophenyl) disulfide. These diphenyl disulfides or the derivative thereof can enhance resilience by having some influence on the state of vulcanization of vulcanized rubber.

Among them, diphenyl disulfide and bis(pentabromophenyl) disulfide are preferably used since a golf ball having particularly high resilience can be obtained.

The amount of the antioxidant to be blended is preferably 0.1 part or more and is preferably 1 part or less based on 100 parts of the base rubber by mass. Further, the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The diameter of the core of the golf ball of the present invention is preferably 39.0 mm or more, more preferably 39.5 mm or more, even more preferably 40.8 mm or more. If the diameter of the core is less than 39.0 mm, the thickness of the cover becomes too thick, so that the resilience is lowered. The upper limit of the diameter of the core is not particularly limited, but it is preferably 42.2 mm, more preferably 42.0 mm, even more preferably 41.8 mm. If the diameter of the core is more than 42.2 mm, the cover becomes relatively too thin, so that the protection effects of the cover cannot be sufficiently obtained.

Further, a compression deformation amount of the core when applying a load from 98 N as an initial load to 1275 N as a final load is preferably 2.50 mm or more, more preferably 2.60 mm or more, even more preferably 2.70 mm or more. If the above deformation amount is too small, the core becomes too hard, so that the shot feeling tends to be lowered. On the other hand, the upper limit of the compression deformation amount when applying a load from the initial load of 98 N to the final load of 1275 N is not particularly limited, but it is preferably 3.20 mm, more preferably 3.10 mm, even more preferably 3.00 mm. If the above deformation amount is too large, the core becomes too soft, so that the shot feeling may feel too heavy.

It is also a preferred embodiment of the present invention to use, as the core of the golf ball, a core having the surface hardness larger than the center hardness. For example, by employing a multi layer core structure, the surface hardness of the core larger than the center hardness thereof can be readily obtained. The difference of the hardness between the surface hardness and the center hardness of the core is preferably 20 or more, more preferably 25 or more in shore D hardness. If the surface hardness of the core is larger than the center hardness thereof, the launch angle becomes higher and the amount of spin becomes lowered, so that the flying distance is improved. The upper limit of the difference in shore D hardness between the surface hardness and the center hardness is not particularly limited, and is preferably 40, more preferably 35. If the difference in the hardness becomes too large, the durability tends to be lowered.

The center hardness of the core is preferably 30 or more, more preferably 32 or more, even more preferably 35 or more in shore D hardness. If the center hardness of the core is less than 30 in shore D hardness, the core becomes too soft, so that the resilience may become lowered. Additionally, the center hardness of the core is preferably 50 or less, more preferably 48 or less, even more preferably 45 or less in shore D hardness. If the center hardness is more than 50 in shore D hardness, the core becomes too hard, so that the shot feeling tends to be lowered. In the present invention, the center hardness of the core means the hardness obtained by measuring the central point of the cut surface of the core cut into halves with the Shore D type spring hardness tester.

The surface hardness of the core of the golf ball of the present invention is preferably 45 or more, more preferably 50 or more, even more preferably 55 or more in shore D hardness. If the above hardness is less than 45, the core becomes so soft that the resilience may become lowered. Further, the surface hardness of the core is preferably 65 or less, more preferably 62 or less, even more preferably 60 or less in shore D hardness. If the surface hardness is more than 65 in shore D hardness, the core becomes so hard that the shot feeling may become lowered.

The golf ball core of the present invention preferably has a PGA compression of 65 or more, more preferably 70 or more. If the PGA compression is less than 65, the resilience will be lowered, or the golf ball may become too soft so that shot feeling will become heavy. An upper limit of the PGA compression is not particularly limited, but it is preferably 115, more preferably 110. If the PGA compression is more than 115, the golf ball becomes too hard so that shot feeling will be lowered.

A structure of the golf ball of the present invention is not particularly limited as long as it has a core and a cover. It may be a two-piece golf ball having a core and a cover covering the core; a three-piece golf ball having a core consisting of a center and an intermediate layer covering the center and the cover covering the intermediate layer; a multi-piece golf ball having a core consisting of a center and a plurality of or multi-layered intermediate layers covering the center, and a cover covering the core, or an would-core golf ball having an wound core and a cover. In any case, the present invention can be suitably applied. Among them, the present invention can be preferably applied to the two-piece golf ball having a core and a cover covering the core.

In the case that the golf ball of the present invention is a three-piece or a multi-piece golf ball, a material for the intermediate layer includes, for example, a thermoplastic resin such as a polyurethane resin, an ionomer resin, Nylon, and polyethylene; a thermoplastic elastomer such as a polystyrene elastomer, a polyolefin elastomer, a polyurethane elastomer, a polyester elastomer, and a polyamide elastomer, and the ionomer resin is preferred.

Examples of the ionomer resin include an ionomer resin prepared by neutralizing at least a part of carboxyl groups in a copolymer composed of ethylene and α,β-unsaturated carboxylic acid with a metal ion, one prepared by neutralizing at least a part of carboxyl groups in a ternary copolymer composed of ethylene, α,β-unsaturated carboxylic acid having 3 to 8 carbon atoms and α,β-unsaturated carboxylic acid ester with a metal ion, or a mixture thereof.

Examples of the α,β-unsaturated carboxylic acid are acrylic acid, methacrylic acid, fumaric acid, maleic acid, and crotonic acid. Acrylic acid and methacrylic acid are preferable. Examples of the α,β-unsaturated carboxylic acid ester are methyl ester, ethyl ester, propyl ester, n-butyl ester, isobutyl ester and the like of acrylic acid, methacrylic acid, fumaric acid, maleic acid and the like. Especially, the ester of acrylic acid and methacrylic acid are preferable. The metal ion for neutralizing at least a part of the carboxyl groups of the copolymer composed of ethylene and α,β-unsaturated carboxylic acid, and the ternary copolymer composed of ethylene, α,β-unsaturated carboxylic acid and α,β-unsaturated carboxylic acid ester includes an alkali metal ion such as sodium, potassium, and lithium; a divalent metal ion such as magnesium, calcium, zinc, barium, and cadmium; a trivalent metal ion such as aluminum, or other metal ions such as tin, and zirconium. Among them, sodium, zinc, and magnesium are preferably used to improve the resilience and the durability.

The intermediate layer may further contain, in addition to the resin component, a gravity adjusting agent such as barium sulfate or tungsten, an antioxidant, a pigment and the like.

In the case that the golf ball of the present invention is a wound-core golf ball, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation]
(1) Abrasion-Resistance

A commercially available pitching wedge was installed on a swing robot available from Golf Laboratories, Inc., and two points of a ball respectively were hit once at the head speed of 36 m/sec. to observe the areas which were hit. Abrasion-resistance was evaluated and ranked into five levels based on following criteria.

E (Excellent): Almost no scratch was present on the surface of the golf ball.
G (Good): Slight scratches were present on the surface of the golf ball.
F (Fair): The surface of the golf ball was abraded a little, and scuffing could be observed.
P (Poor): The surface of the golf ball was abraded considerably, and scuffing was conspicuous.
B (Bad): The surface of the golf ball was abraded considerably, and dimples were scraped away to give a flat surface.

(2) Durability

Each golf ball was repeatedly hit with a metal head driver (W#1) attached to a swing robot manufactured by TRU-ETEMPER CO, at the head speed of 45 m/sec. to make the golf ball collide with a collision board. Times up to which the golf balls are cracked were measured. In addition, each value obtained was reduced to an index number relative to the measured value obtained in Golf ball No. 14 being assumed 100. The larger number indicates better durability.

(3) Slab Hardness (Shore D Hardness)

Using the cover composition, a sheet having a thickness of about 2 mm were prepared by hot press molding and preserved at the temperature of 23° C. for two weeks. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD.

(4) Spherical Core Hardness

The shore D hardness measured at a surface part of a spherical core using P1-type automatic rubber hardness tester equipped with the Shore D type spring hardness tester specified by ASTM-D2240 manufactured by Kobunshi Keiki Co., Ltd., was determined as the surface hardness of the spherical core, and the shore D hardness obtained by cutting a spherical core into halves and measuring at a center of the cut surface was determined as the center hardness of the spherical core.

(5) Compression Deformation Amount (mm)

The compression deformation amount (amount the golf ball shrinks along the compression direction: mm) of the golf balls or the spherical cores was measured when applying a load from 98 N (10 kgf) as an initial load to 1275 N (130 kgf) as a final load to the golf balls or the cores.

[Preparation of Polyisocyanate Mixture (B)]

(1) Polyisocyanate Mixture (B) Containing the Urethane Prepolymer (b-1a)

A predetermined amount of the polyisocyanate and the polyol shown in Table 1 were used to carry out a reaction at 80° C. for 2 hours under a dried nitrogen atmosphere, thereby obtaining an isocyanate group-terminated urethane prepolymer (b-1a).

TABLE 1

| | Raw material | | Average molecular weight | Polyisocyanate mixture (B) | | | | | |
|---|---|---|---|---|---|---|---|---|---|
| | | | | A | B | C | D | E | F |
| Urethane prepolymer (b-1a) | Polyisocyanate | MDI | 250 | 250 | 250 | 250 | 250 | — | — |
| | | $H_{12}$MDI | 262 | — | — | — | — | 262 | 262 |
| | | HDI isocyanurate | 505 | — | — | — | — | — | — |
| | Polyol | PTMG1000 | 1000 | 500 | 750 | — | — | 500 | 750 |
| | | PTMG2000 | 2000 | — | — | 1000 | 1500 | — | — |
| | Number of functional groups | | | 2 | 2 | 2 | 2 | 2 | 2 |
| Thermoplastic polyester elastomer (b-2) | | HYTREL 3046 | — | 1500 | 2000 | 2500 | 3500 | 1524 | 2024 |
| NCO content (NCO %) of Urethane Prepolymer (b-1) | | | | 5.6 | 2.1 | 3.4 | 1.2 | 5.5 | 2.1 |
| NCO content (NCO %) of Polyisocyanate mixture (B) | | | | 1.9 | 0.7 | 1.1 | 0.4 | 1.8 | 0.7 |

| | Raw material | | Average molecular weight | Polyisocyanate mixture (B) | | | | | |
|---|---|---|---|---|---|---|---|---|---|
| | | | | G | H | I | J | K | L |
| Urethane prepolymer (b-1a) | Polyisocyanate | MDI | 250 | — | — | 250 | — | 250 | — |
| | | $H_{12}$MDI | 262 | 262 | 262 | — | 262 | — | — |
| | | HDI isocyanurate | 505 | — | — | — | — | 505 | 1010 |
| | Polyol | PTMG1000 | 1000 | — | — | — | — | 1000 | 1000 |
| | | PTMG2000 | 2000 | 1000 | 1500 | — | — | — | — |
| | Number of functional groups | | | 2 | 2 | 2 | 2 | 3 | 4 |
| Thermoplastic polyester elastomer (b-2) | | HYTREL 3046 | — | 2524 | 3524 | 500 | 500 | 3510 | 4020 |
| NCO content (NCO %) of Urethane Prepolymer (b-1) | | | | 3.3 | 1.2 | — | — | — | — |
| NCO content (NCO %) of Polyisocyanate mixture (B) | | | | 1.1 | 0.4 | 11.2 | 11.0 | 2.4 | 2.8 |

Formulation: g

Notes on Table 1

MDI: 4,4'-diphenylmethane diisocyanate manufactured by Tokyo Chemical Industry Co., Ltd.

$H_{12}$MDI: 4,4'-dicyclohexylmethane diisocyanate manufactured by Tokyo Chemical Industry Co., Ltd.

HDI isocyanurate: TAKENATE D-170N manufactured by Mitsui Chemicals Polyurethanes, Inc.

PTMG1000: polyoxytetramethylene glycol, having a number average molecular weight of 1000 manufactured by Mitsubishi Chemical Co.

PTMG2000: polyoxytetramethylene glycol having a number average molecular weight of 2000 manufactured by Mitsubishi Chemical Co.

Next, as a thermoplastic resin which does not substantially react with isocyanate groups, a thermoplastic polyester elastomer ("HYTREL 3046" manufactured by DU PONT-TORAY Co.) from which water had been removed by drying in advance (b-2) was prepared. The isocyanate group-terminated urethane prepolymer (b-1a) and the thermoplastic polyester elastomer (b-2) were blended in a proportion of 1:2 by mass ratio, and were kneaded in a mixing roll at 120° C. to 180° C. for 5 to 10 minutes. The resultant mixture was discharged and pulverized, thereby obtaining a pellet of the polyisocyanate mixture (B).

(2) Polyisocyanate Mixture (B) Containing the Polyisocyanate (b-1b)

As the thermoplastic resin which does not substantially react with an isocyanate group, one obtained by drying to dehydrate in advance a thermoplastic polyester elastomer ("HYTREL 3046" manufactured by DU PONT-TORAY Co.) (b-2) was prepared. The polyisocyanate (b-1b) and the thermoplastic polyester elastomer (b-2) shown in Table 2 were blended in a proportion of 1:3 by mass ratio, and were kneaded in a mixing roll at 120° C. to 180° C. for 5 to 10 minutes. The resultant mixture was taken out and pulverized, thereby obtaining a pellet of the polyisocyanate mixture (B).

TABLE 2

| Raw material | | Average molecular weight | Polyisocyanate mixture (B) | | |
|---|---|---|---|---|---|
| | | | M | N | O |
| Polyisocyanate | MDI | 250 | 250 | — | — |
| Trifunctional polyisocyanate (b-1b) | TAKENATE D-170N | 504.6 | — | 504.6 | — |
| | TAKENATE D-127N | 666.9 | — | — | 666.9 |
| Thermoplastic polyester elastomer (b-2) | HYTREL 3046 | — | 750 | 750 | 750 |
| NCO content (NCO %) of Polyisocyanate (b-1b) | | — | 25.0 | 18.9 | |
| NCO content (NCO %) of Polyisocyanate mixture (B) | | 8.4 | 10.0 | 8.9 | |

Formulation: g
Notes on Table 2
MDI: 4,4'-diphenylmethane diisocyanate manufactured by Tokyo Chemical Industry Co., Ltd.
TAKENATE D-170N: HDI isocyanurate (trimeric) manufactured by Mitsui Chemicals Polyurethanes, Inc.; MW = 504.6
TAKENATE D-127N: H$_6$XDI isocyanurate (trimeric) manufactured by Mitsui Chemicals Polyurethanes, Inc.; MW = 666.9

[Preparation of Two-piece Golf Ball]

(1) Preparation of Core

The rubber composition shown in Table 3 was kneaded and pressed with upper and lower molds each having a spherical cavity at the heating condition of 160° C. for 13 minutes to obtain the core in a spherical shape having a diameter of 40.7 mm and a weight of 43.2 g.

TABLE 3

| Rubber composition for core | parts by mass |
|---|---|
| Polybutadiene rubber | 100 |
| Zinc acrylate | 35 |
| Zinc oxide | 5.0 |
| Barium sulfate | 14.0 |
| Diphenyl disulfide | 0.5 |
| Dicumyl peroxide | 0.9 |

TABLE 3-continued

| Rubber composition for core | parts by mass |
|---|---|
| Center hardness of core (shore D hardness) | 40 |
| Surface hardness of core (shore D hardness) | 58 |

Notes on Table 3
Polybutadiene rubber: BR730 (high cis-polybutadiene) manufactured by JSR Corporation
Zinc acrylate: ZNDA-90S manufactured by NIHON JYORYU KOGYO Co., LTD.
Zinc oxide: Ginrei R manufactured by Toho-Zinc Co.
Barium sulfate: barium sulfate BD manufactured by Sakai Chemical Industry Co., Ltd.
Dicumyl peroxide: Percumyl D manufactured by NOF Corporation
Diphenyl disulfide: manufactured by Sumitomo Seika Chemicals Company Limited (2) Preparation of Cover Composition and Golf Ball Body (A) Thermoplastic polyurethane (ELASTOLLAN XNY97A, ET890 manufactured by BASF) in the form of a pellet, (B) polyisocyanate mixture in the form of a pellet, and an additive for cover (titanium oxide) shown in Tables 4 to 6 were dry-blended using a tumbler type mixer to prepare a cover composition.

(2-1) Injection-Molding

The resultant cover composition was injection-molded onto the core thus obtained to form the cover. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 second. After the cooling for 30 seconds, the molds were opened and then the golf ball body was discharged.

(2-2) Compression-Molding

Molding of half shells were performed by charging a pellet of the cover composition thus obtained into each of the depressed part of the lower mold for molding half shells, and applying pressure to mold half shells. Compression molding was conducted at the temperature of 170° C. for 5 minutes under the molding pressure of 2.94 MPa.

The core obtained above was covered with two half shells in a concentric manner and the cover (thickness of 0.5 mm) was molded by compression molding. Compression molding was performed at the temperature of 150° C. for 2 minutes under the molding pressure of 9.8 MPa to obtain a golf ball body.

(3) The surface of the obtained golf ball body was subjected to sandblast treatment and marking followed by coating a clear paint, drying at the temperature of 40° C. for 4 hours in an oven to dry the paint to obtain a golf ball having a diameter of 42.7 mm and a weight of 45.4 g.

The obtained golf ball was evaluated in terms of abrasion-resistance and durability. The results are shown in Tables 4 to 6.

TABLE 4

| | | Golf ball No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | Structure | Two-piece | Two-piece | Two-piece | Two-piece | Two-piece | Two-piece | Two-piece | Two-piece | Two-piece | Two-piece | Two-piece |
| Cover composition | | | | | | | | | | | | |
| (B) | A | 13 | — | — | — | — | — | — | — | — | — | — |
| | B | — | 17 | — | — | — | — | — | — | — | — | — |
| | C | — | — | 21 | — | — | — | — | — | — | — | — |
| | D | — | — | — | 30 | — | — | — | — | 30 | — | — |
| | E | — | — | — | — | 13 | — | — | — | — | — | — |
| | F | — | — | — | — | — | 17 | — | — | — | — | — |
| | G | — | — | — | — | — | — | 21 | — | — | — | — |
| | H | — | — | — | — | — | — | — | 30 | — | — | — |
| | I | — | — | — | — | — | — | — | — | — | — | — |
| | J | — | — | — | — | — | — | — | — | — | — | — |
| | K | — | — | — | — | — | — | — | — | — | 13 | — |
| | L | — | — | — | — | — | — | — | — | — | — | 13 |
| (A) | XNY97A | 100 | 100 | 100 | 100 | 100 | 100 | 100 | 100 | — | 100 | 100 |
| | ET890 | — | — | — | — | — | — | — | — | 100 | — | — |
| | Titanium oxide | 4 | 4 | 4 | 4 | 4 | 4 | 4 | 4 | 4 | 4 | 4 |
| | Method of cover molding | Injection | Injection | Injection | Injection | Injection | Injection | Injection | Injection | Injection | Injection | Injection |
| Slab hardness of cover (Shore D) | | 48 | 48 | 48 | 47 | 48 | 48 | 48 | 47 | 41 | 48 | 48 |
| Properties | | | | | | | | | | | | |
| | Abrasion-resistance | G | G | G | G | E | E | E | E | G | G | E |
| | Durability | 105 | 110 | 107 | 113 | 108 | 112 | 109 | 116 | 111 | 119 | 123 |

Composition: parts by mass

TABLE 5

| | | Golf ball No. | | | |
|---|---|---|---|---|---|
| | | 12 | 13 | 14 | 15 |
| | Structure | Two-piece | Two-piece | Two-piece | Two-piece |
| Cover composition | | | | | |
| (B) | A | — | — | — | — |
| | B | — | — | — | — |
| | C | — | — | — | — |
| | D | — | — | — | — |
| | E | — | — | — | — |
| | F | — | — | — | — |
| | G | — | — | — | — |
| | H | — | — | — | — |
| | I | 4 | — | — | — |
| | J | — | 4 | — | — |
| (A) | XNY97A | 100 | 100 | 100 | 100 |
| | ET890 | — | — | — | — |
| | Titanium oxide | 4 | 4 | 4 | 4 |
| | Method of cover molding | Injection | Injection | Injection | Compression |
| Slab hardness of cover (Shore D) | | 48 | 48 | 47 | 47 |
| Properties | | | | | |
| | Abrasion-resistance | F | F | B | F |
| | Durability | 99 | 101 | 100 | 72 |

Composition: parts by mass
(B): Polyisocyanate mixture (B)
(A): Thermoplastic Polyurethane (A)

Golf ball Nos. 1 to 11 are golf balls having a cover formed by using a cover composition containing the thermoplastic polyurethane (A) and the polyisocyanate mixture (B) in which the urethane prepolymer (b-1a) is dispersed in the thermoplastic resin (b-2) which does not substantially react with isocyanate groups. They exhibited considerable improvement in abrasion-resistance and durability compared with Golf ball Nos. 12 and 13 using, as the polyisocyanate mixture (B), a mixture obtained by dispersing an isocyanate monomer in a thermoplastic resin which does not substantially react with an isocyanate group. Additionally, Golf ball Nos. 14 and 15 are cases in which the cover was molded without crosslinking the thermoplastic polyurethane. Both of them exhibit lowering of abrasion-resistance and durability compared with Golf ball Nos. 1 to 11.

TABLE 6

| | Golf ball No. | | | | | | | | |
|---|---|---|---|---|---|---|---|---|---|
| | 16 | 17 | 18 | 19 | 20 | 21 | 22 | 23 | 24 |
| Structure | Two-piece | Two-piece | Two-piece | Two-piece | Two-piece | Two-piece | Two-piece | Two-piece | Two-piece |
| Cover composition | — | — | — | — | — | — | — | — | — |
| Polyisocyanate M | — | — | — | — | — | 5 | 15 | — | — |
| mixture (B) N | 3 | 10 | — | — | 10 | — | — | — | — |
| O | — | — | 3 | 10 | — | — | — | — | — |
| Themoplastic XNY97A | 100 | 100 | 100 | 100 | — | 100 | 100 | 100 | 100 |
| Resin (A) ET890 | — | — | — | — | 100 | — | — | — | — |
| Titanium oxide | 4 | 4 | 4 | 4 | 4 | 4 | 4 | 4 | 4 |
| Method of cover molding | Injection | Injection | Injection | Injection | Injection | Injection | Injection | Injection | Compression |
| Slab hardness of cover (Shore D) | 47 | 48 | 47 | 48 | 48 | 47 | 48 | 47 | 47 |
| Properties | — | — | — | — | — | — | — | — | — |
| Abrasion-resistance | G | E | G | E | E | F | P | B | F |
| Durability | 108 | 135 | 106 | 131 | 132 | 95 | 96 | 100 | 72 |

Composition: parts by mass

Golf ball Nos. 16 to 20 are golf balls having a cover formed by using a cover composition containing the thermoplastic polyurethane (A) and the polyisocyanate mixture (B) in which the polyisocyanate (b-1b) having at least three isocyanate groups is dispersed in the thermoplastic resin (b-2) which does not substantially react with isocyanate groups.

In Golf ball No. 21, a polyisocyanate mixture in which bifunctional polyisocyanate had been dispersed was used. It can be seen that abrasion-resistance thereof is low. When an amount of the polyisocyanate mixture in which bifunctional polyisocyanate had been dispersed to be used was increased in order to enhance crosslink density, the abrasion-resistance was lowered adversely (Golf ball No. 22). Both Golf ball Nos. 23 and 24 are golf balls having a cover formed by using a thermoplastic polyurethane alone. It can be seen that abrasion-resistance thereof is low. In particular, in Golf ball No. 24, durability was lowered, too.

The present invention is preferable for a golf ball which is excellent in abrasion-resistance and durability.

This application is based on Japanese Patent applications Nos. 2006-356547, and 2006-356548 filed on Dec. 28, 2006, and Nos. 2007-190111, and 2007-190112 filed on Jul. 20, 2007, the contents of which are hereby incorporated by reference.

What is claimed is:

1. A golf ball comprising a core and a cover, wherein the cover is made from a cover composition containing, as a resin component,
   a thermoplastic polyurethane (A) and
   a polyisocyanate mixture (B) in which a polyisocyanate (b-1b) having at least three isocyanate groups is dispersed in a thermoplastic resin (b-2) which does not substantially react with the isocyanate groups, wherein said polyisocyanate mixture (B) containing the polyisocyanate (b-1b) has NCO content (NCO %) of 8.4 mass % to 30.0 mass %.

2. The golf ball according to claim 1, wherein the thermoplastic resin (b-2) which does not substantially react with the isocyanate groups is at least one kind selected from the group consisting of a polyester elastomer, an acrylic elastomer, a styrene elastomer, an olefin elastomer, and a vinyl chloride elastomer.

3. The golf ball according to claim 1, wherein the cover composition contains the polyisocyanate mixture (B) containing the polyisocyanate (b-1b) in an amount of 1 part by mass to 50 parts by mass relative to 100 parts by mass of the thermoplastic polyurethane (A).

4. The golf ball according to claim 1, wherein the polyisocyanate mixture (B) containing the polyisocyanate (b-1b) has NCO content (NCO %) of 8.5 mass % to 30.0 mass %.

5. The golf ball according to claim 1, wherein the polyisocyanate (b-1b) has NCO content (NCO %) of 1.5 mass % to 30.0 mass %.

6. The golf ball according to claim 1, wherein the polyisocyanate (b-1b) is an isocyanurate of isophorone diisocyanate, hexamethylene diisocyanate, or hydrogenated xylylene diisocyanate.

7. The golf ball according to claim 1, wherein the polyisocyanate (b-1b) and the thermoplastic resin (b-2) are blended in the polyisocyanate mixture (B) (a total of 100 mass %) in a ratio of the polyisocyanate (b-1b)/thermoplastic resin (b-2)= 5 mass % to 50 mass %/50 mass % to 95 mass %.

8. The golf ball according to claim 1, wherein shore D hardness of the cover is from 20 to 60.

* * * * *